United States Patent Office 3,544,671
Patented Dec. 1, 1970

3,544,671
PROCESS FOR NECK DRAWING BLOCK COPOLYMER FILMS AND FILAMENTS
Denis James Henry Sandiford, Welwyn, England, assignor to Imperial Chemical Industries Limited, London, England, a corporation of Great Britain
No Drawing. Continuation of application Ser. No. 563,696, July 8, 1966. This application July 1, 1969, Ser. No. 840,596
Claims priority, application Great Britain, July 14, 1965, 29,821/65
Int. Cl. D01d 5/12; B29c 17/02
U.S. Cl. 264—210                             6 Claims

ABSTRACT OF THE DISCLOSURE

A process for preparing an oriented, voided structure which comprises forming a crystalline olefin copolymer composition into a structure suitable for drawing, quenching the said structure and drawing the same under conditions of temperature, draw ratio, and draw rate such that it draws through a neck.

---

This is a continuation of Serial No. 563,696, filed July 8, 1966 and now abandoned.

This invention relates to a process for forming voided films and fibers of olefin polymers in particular to those of crystalline polymers of at least two different monoolefins.

The production of an oriented, shaped structure, e.g., a film, of crystalline homopolymer having voids therein whereby its density is less than 0.80 g./cc. has been described in British Patent 922,288. The conditions for producing such voided structures span a narrow range of combinations of conditions of temperature, draw ratio and draw rate which are not readily maintained under large scale operation conditions. Furthermore, it has been found that the voids and low density created in such homopolymers are not stable to heat and pressure, which cause the polymer to revert to the more normal transparent state under conditions of storage and use.

In accordance with the present invention, it has been found that if a crystalline block copolymer of two different olefins containing segments of two or more different polymers is formed into a shape suitable for drawing, i.e., a film or fiber, quenched, and then drawn under conditions of temperature, draw ratio, and draw rate such that the film or fiber draws through a neck, there is produced a voided film or fiber in which the voids are stable under the usually encountered conditions of storage and use. In addition, the conditions required for producing such voided structures are fairly widely variable and hence adaptable to commercial operating procedures.

The term "crystalline block copolymer of two different monoolefins containing segments of two or more different polymer segments" is used herein in the sense that such term is commonly employed in art as meaning the homogeneous product of polymerization resulting from the sequential polymerization of (1) a first olefin monomer and (2) a mixture of the first monomer with a second olefin monomer in the presence of a stereospecific polymerization catalyst. The most convenient method for making such compositions is to homopolymerize an olefin in a liquid diluent to form a homopolymer and then introduce a second olefin while there remains some unpolymerized first olefin. At this point the polymerization continues as a copolymerization and if the introduction of second monomer is continued past the stage at which the first monomer is exhausted, some homopolymerization of the second monomer will occur. In theory, the product of such a process is intended to be composed of macromolecules in which one or more segments of the homopolymer of the first monomer (A) alternate with one or more segments of a copolymer of the first monomer and the second monomer (B), viz:

$$(AAAAAA—ABABAB)_n$$

where $n$ equals an integer of one or more depending on the number of polymerization sequences. If polymerization of the second monomer is continued after the exhaustion of the first monomer the theoretical repeating unit will have the structure $$(AAAAAA—ABABAB—BBBBBB)_n$$

However, there is substantial evidence that the so-called "copolymer" is actually an intimate mixture of a homopolymer of the first monomer and a copolymer of the two monomers and, optimally, homopolymer of the second monomer, the mixture being homogeneous in the sense that there exists a uniform dispersion of the component polymers throughout the project. Hence, in using the term "block copolymer" it is not intended to restrict the invention to polymeric compositions of true block copolymer structure, but rather it is intended to include the compositions commonly referred to as "block copolymers" even though such may not be the case. Henceforth, for the sake of brevity, the "crystalline block copolymer of two different monoolefins containing segments of two or more different polymers" will be referred to as a "copolymer composition."

The copolymer compositions employed in the invention are those in which 75 to 95% by weight is derived from the monomer forming the major homopolymer segment, which is preferably propylene, and 5 to 25% by weight is derived from the second monomer included in the copolymer segment, which is preferably ethylene. However, in place of either of these monomers there can be used butene-1, 3-methyl butene-1, or 4-methyl pentene-1.

Processes of producing the copolymer compositions employed in this invention are described in, for example, British Patent 970,478, as well as in copending U.S. application Serial No. 409,974, the disclosures of which are incorporated herein by reference.

The voiding in the films or fibers, referred to above, is believed to result from a separation of the homopolymer and copolymer phases present in the copolymer composition upon drawing thereof. This separation of phases results in an opacification or whitening of the composition with a concurrent reduction in the overall density of the structure. By selection of the degree of voiding to be accomplished during the drawing step, it is possible to produce particles having density as low as about 0.45 g./cc. up to about 0.90 g./cc.

The combination of conditions chosen for any copolymer composition will depend on the nature of the copolymer composition and the degree of voiding required of the finished product. For example, films prepared from the voided copolymer composition are frequently employed as decorative films suitable for packaging and write-on application. For these applications, a substantial amount of density reduction is not always required as a density on the order of about 0.800 to 0.895 g./cc. will usually suffice. In some applications, a higher degree of voiding, i.e., lower density, is sometimes needed. For example, a high degree of voiding imparts good dielectric properties to films and tapes making them useful as cable wrappings. These fibers also exhibit improved knottability, as compared with a conventional polypropylene fiber due to the crushability imparted to them by their voided structure. This makes them useful in applications where they must be tied, as for example, in string and twine. The higher bulk also makes these fibers useful as cores for ropes such as hawsers for ships and for twine such as baler twine which must be tied mechanically.

The structures suitable for drawing are preferably molded by extrusion of a molten copolymer composition through an appropriate die followed immediately by a relatively low temperature quench. This, however, is not a limitation on the method as in some cases suitable structures can be prepared by compression molding or other techniques, again followed immediately by quenching.

By "drawing through a neck" is meant that there is an abrupt thinning in the polymer being drawn, be it film or fiber, at the point at which drawing occurs. With the copolymer compositions of this invention such drawing through a neck can occur over wide ranges of combinations of drawing temperature, draw ratios and draw rates.

In producing the voided polymer structures according to this invention, it has been found that the drawing rate, in particular, is subject to considerable variation. The rate can vary from a low of about 200% per minute to a high of about 300,000% per minute and even higher. There appears to be a correlation between the ultimate density of the polymer and the rate of drawing, lower drawing rates generally giving lower density.

A further factor is the temperature at which the molded film or fiber is quenched. In general, higher quenching temperatures lead to a more crystalline copolymer composition which is more emenable to producing voids when drawn at a particular set of conditions. Because of this it is preferred to use higher quenching temperatures. Temperatures on the order of about 20° to 60° C. are usually satisfactory.

The lower usable limit of draw ratio at any temperature for particular copolymer composition is set by that ratio at which a uniformly voided drawn product can be produced. The upper limit is set by a tendency toward a fibrillation which is present at very high draw ratios. If a tendency towards fibrillation is not undesirable, e.g., in the production of film laminates, then these high draw ratios can be used.

The temperatures of drawing will depend on the characteristics of the particular copolymer composition used, but it is found that the best results are obtained by drawing at a temperature below the melting point of the lower melting constituent of the copolymer composition. In the case of films, the drawing can be longitudinal and/or transverse.

Heating may be accomplished by bringing the structure near to or into contact with a heated surface, e.g., a roller over which the film or fiber passes. Alternatively, an infrared line or bar heater may be used, preferably in conjunction with a reflector, so that the heat is applied over a narrow zone from which the polymer draws. In general, the procedures employed for drawing are the same procedures known to the art for conventional fibers and films.

The following examples illustrate, but in no way limit, the invention.

EXAMPLE 1

A copolymer composition was prepared using a catalyst prepared by the reduction of titanium tetrachloride with aluminum ethyl sesquichloride, activated by the addition of 2 moles of aluminum diethyl chloride per mole of reduced titanium compound. The polymerization medium was 73 liters of dry, de-gassed, high boiling hydrocarbon fraction, in which was suspended 10 millimoles of catalyst per liter. With the temperature at 50° C. propylene was passed into the reaction vessel at 6.5 lbs. per hour for about 70 minutes, whereupon the pressure was allowed to drop to about 1½ atmospheres and 1.13 lbs. of ethylene were added, and permitted to react out to atmospheric pressure. The material obtained was de-ashed with butanol, and dried, and a copolymer composition containing about 87% propylene and 13% ethylene was recovered. The copolymer composition was extruded in the form of a film onto a casting drum which was maintained at 50° C. and then longitudinally drawn between two rollers, the first roller being heated to 89° C. and the second maintained at room temperature. The distance over which the film was drawn between the two rollers was approximately 0.5 inch, the feed rate of the undrawn film was 7 ft. per minute and the draw ratio was 5.6:1 giving a drawing rate of approximately 260,000% per minute. The density of the undrawn film was 0.898 g./cc. and that of the drawn film 0.874 g./cc. The film produced was of a uniform silvery appearance.

Other portions of the same copolymer were extruded and drawn in the same way except that draw ratios of 4.3 and 3.6 were used. Again, in each case, a film of uniform silvery appearance was produced. The dart impact energy of the film was measured with the results shown in Table 1 which table also lists the draw ratios and densities of the drawn films.

For comparison, a sample of crystalline propylene homopolymer film was extruded and drawn at draw ratios of 3.3, 4.1 and 5.1 using otherwise the same conditions as used for the copolymer compositions above. The films produced did not show the presence of voids at all and further, as can be shown from the results in Table 2, the dart impact energy was much lower than that of the copolymer film especially at the higher draw ratios.

TABLE 1.—COPOLYMER FILM

| Draw ratio | Thickness of drawn film (inches) | Dart impact energy (g.) | Impact energy per unit volume | Density of drawn film (g./cc.) |
| --- | --- | --- | --- | --- |
| 3.6 | 0.0013 | 71 | 54,000 | 0.898 |
| 4.3 | 0.0010 | 54 | 54,000 | 0.891 |
| 5.6 | 0.0009 | 102 | 113,000 | 0.873 |

TABLE 2.—HOMOPOLYMER FILM

| Draw ratio | Thickness of drawn film (inches) | Dart impact energy (g.) | Impact energy per unit volume | Density of drawn film (g./cc. |
| --- | --- | --- | --- | --- |
| 3.3 | 0.0011 | 31 | 28,000 | 0.895 |
| 4.1 | 0.0009 | 22 | 24,000 | 0.895 |
| 5.1 | 0.0006 | 14 | 23,000 | 0.893 |

The dart impact energy was measured as follows:

The sample of film to be tested was clamped between two plates having registering circular holes 1½ inches in diameter. Darts of steadily increasing weights were dropped through a distance of 40 cm. onto the film. 20 samples were tested for each weight of dart and the percentage of the samples which were broken at each dart weight was measured.

By plotting dart weight against percentage failure, the weight of the dart, in grams, at which 50% of the samples failed can be estimated. This was taken as the dart impact energy. The impact energy per unit volume was obtained by dividing the dart impact energy so determined by the thickness (in inches) of the film samples.

EXAMPLE 2

A copolymer composition containing about 78% propylene and 22% ethylene, prepared substantially as set forth in Example 1, was melt spun into a monofilament about 0.25 inch in diameter at about 260° C. and immediately quenched in water. The quenched monofilament was drawn about 7× from a neck at 40° C. at a rate of about 210 feet per minute and thereafter heat set under tension at about 140° C. A control sample of homopolypropylene was simultaneously subjected to the same treatments.

Both the homopolymer and the copolymer exhibited a substantial amount of whitening upon being drawn. Both were then heat set under tension at 140° C. for about ten minutes. The whiteness disappeared from the homopolymer sample during this treatment but the copolymer remained silvery in appearance.

In Table 2 there is shown a comparison of the properties of the homopolymer and copolymer filaments.

TABLE 3

|  | Homopolymer | Copolymer |
|---|---|---|
| Density unstretched, g./cc. | 0.90 | 0.90 |
| Density stretched, g./cc. | 0.87 | 0.80 |
| Density heat set, g./cc. | 0.90 | 0.82 |
| Tensile strength (heat set), g.p.d.* | 5.5 | 4.00 |

*Grams per denier.

EXAMPLE 3

A copolymer composition containing about 91% propylene and 9% ethylene prepared as in Example 1 was compression molded into .040 inch plaques at about 420° for 5 minutes and cooled under pressure. Specimens 0.5 inch wide were drawn about 6× from a neck at 23° C. at about 20 inches per minute and heat set at about 140° C. The properties of the resultant tapes are compared with those of a similarly treated homopolymer in the following table.

TABLE 4

|  | Homopolymer | Copolymer |
|---|---|---|
| Density unstretched, g./cc. | 0.91 | 0.90 |
| Density stretched | 0.77 | 0.45 |
| Density (heat set) | 0.81 | 0.49 |
| Tensile strength (heat set), p.s.i. | 46,000 | 25,000 |
| Modulus (heat set), p.s.i. | 620,000 | 380,000 |

As in the case of the filaments of Example 2 the homopolymer films lost their whiteness and became almost transparent during the heat setting.

When pressure was applied to the films with a stylus, simulating writing thereon, the pressured sections of the homopolymer film became transparent, while those of the copolymer retained their opacity.

What is claimed is:

1. A process for preparing an oriented voided structure which structure has a density as low as .45 g./cc. which comprises forming a structure suitable for drawing from a material consisting essentially of a crystalline block copolymer of two different monoolefins containing segments of two or more different polymer segments, said block copolymer being those in which 75 to 95% by weight is derived from a first monoolefin forming a homopolymer segment and 5 to 25% by weight is derived from a second monoolefin included in the copolymer segment and the said monoolefins being selected from the group consisting of propylene, ethylene, a butene and a pentene, quenching the said structure at temperatures between 20° C. and 60° C., and neck drawing the structure at a draw ratio of between 3.6 to 1 and about 7 to 1, and at a draw temperature which is below the melting point of the lowest melting point constituent of the said block copolymer.

2. The process of claim 1 where the said mono olefins are mono α-olefin and said first and second mono α-olefin are sequentially polymerized in the presence of a stereospecific polymerization catalyst.

3. The process of claim 1 where the olefin copolymer is comprised of about 75 to 95% propylene and 25 to 5% ethylene, said ethylene and propylene being sequentially polymerized in the presence of a stereospecific polymerization catalyst.

4. The process of claim 3 where the rate of drawing is between about 200% and 300,000% per minute.

5. The process of claim 3 where the structure suitable for drawing is a film.

6. The process of claim 3 where the structure suitable for drawing is a filament.

References Cited

UNITED STATES PATENTS

| 2,352,725 | 7/1944 | Markwood | 264—108 |
| 2,948,583 | 8/1960 | Adams et al. | 264—210 |
| 3,022,541 | 2/1962 | Passley et al. | 264—210 |
| 3,175,999 | 3/1965 | Natta et al. | 260—93.7 |
| 3,184,369 | 5/1965 | Haseley | 264—78 |
| 3,214,503 | 10/1965 | Markwood | 264—210 |
| 3,407,253 | 10/1968 | Yoshimara et al. | 264—289 |
| 3,426,754 | 2/1969 | Biernbaum et al. | 264—210 |

FOREIGN PATENTS

| 40/2,279 | 2/1965 | Japan | 264—176 |
| 594,018 | 5/1959 | Italy | 260—88.2 |

JULIUS FROME, Primary Examiner

J. H. WOO, Assistant Examiner

U.S. Cl. X.R.

260—2.5, 878; 264—288, 290